(12) United States Patent
Li et al.

(10) Patent No.: US 7,894,392 B2
(45) Date of Patent: Feb. 22, 2011

(54) METHOD, SYSTEM, ACCESS TERMINAL AND ACCESS NETWORK FOR TRANSMITTING FORWARD TRAFFIC CHANNEL AT FIXED RATE

(75) Inventors: Peng Li, Shenzhen (CN); Juejun Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 823 days.

(21) Appl. No.: 11/859,016

(22) Filed: Sep. 21, 2007

(65) Prior Publication Data

US 2008/0008151 A1    Jan. 10, 2008

Related U.S. Application Data

(63) Continuation of application No. PCT/CN2006/001980, filed on Aug. 7, 2006.

(30) Foreign Application Priority Data

Sep. 30, 2005    (CN) .................. 2005 1 0105698

(51) Int. Cl.
*H04W 4/00* (2009.01)
(52) U.S. Cl. ...................................... 370/329
(58) Field of Classification Search ................ None
See application file for complete search history.

(56) References Cited

U.S. PATENT DOCUMENTS

| | | | |
|---|---|---|---|
| 6,628,611 B1 * | 9/2003 | Mochizuki | 370/229 |
| 7,092,717 B2 * | 8/2006 | Au et al. | 455/452.1 |
| 7,167,461 B2 * | 1/2007 | Odenwalder et al. | 370/335 |
| 2005/0047344 A1 | 3/2005 | Seol | |

FOREIGN PATENT DOCUMENTS

| | | |
|---|---|---|
| CN | 1416623 | 5/2003 |
| CN | 1669242 | 9/2005 |
| CN | 1669242 A | 9/2005 |
| WO | 03/096570 A1 | 11/2003 |
| WO | WO2004/114549 | 12/2004 |

OTHER PUBLICATIONS

English Translation of Written Opinion of the International Search Authority.
Chinese First Office Action 200510105698.4 and the English Translation.
Chinese Notice of Rejection for Chinese Appln. 200510105698.4 and English Translation.
Canadian Office Action dated Apr. 14, 2010 for Canadian Appln. 2,602,178.
3GPP2 C.S0024-A "cdma2000 High Rate Packet Data Air Interface Specification", Version 1.0 Mar. 2004, 3$^{rd}$ Generation Partnership Project 2 "3GPP2".

\* cited by examiner

*Primary Examiner*—Robert W Wilson
(74) *Attorney, Agent, or Firm*—Slater & Matsil, L.L.P.

(57) ABSTRACT

The present invention provides a method, a system, an access terminal and an access network for transmitting a forward traffic channel at a fixed rate. In the present invention, an access terminal transmits identification information of one or more specific forward carrier links to an access network when the access terminal determines that it needs to receive one or more forward traffic channels at a fixed rate from the one or more specific forward carrier links as designated. The access network transmits one or more forward traffic channels at the fixed rate according to the received identification information. The inventive access terminal may choose to receive a forward traffic channel(s) at a fixed rate from a forward carrier link(s) of a sector(s) as designated, thereby enhancing flexibility in transmitting a forward traffic channel and improving the multiple carrier EV-DO technology.

17 Claims, 1 Drawing Sheet

Figure 1:
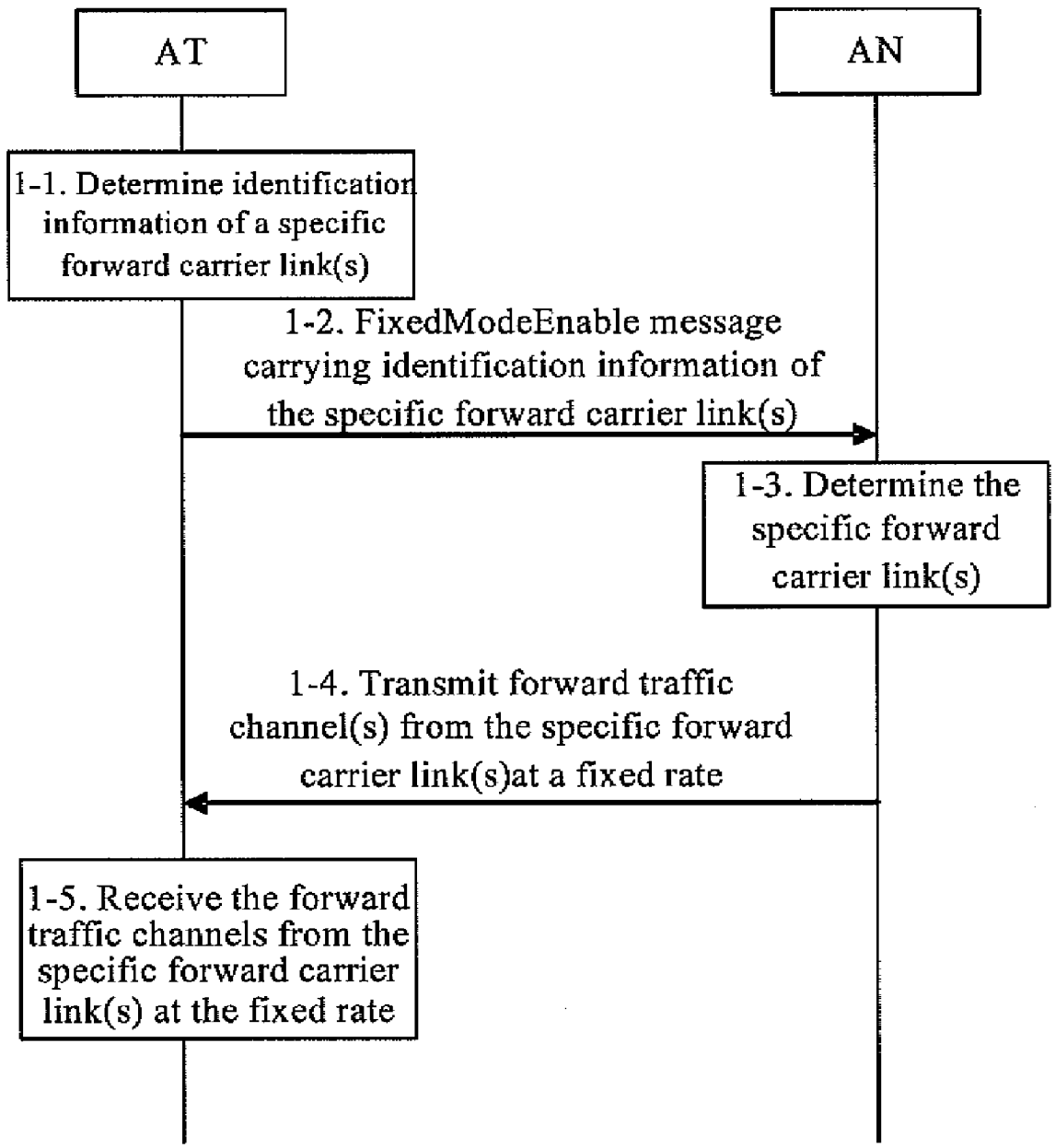

METHOD, SYSTEM, ACCESS TERMINAL AND ACCESS NETWORK FOR TRANSMITTING FORWARD TRAFFIC CHANNEL AT FIXED RATE

CROSS-REFERENCE TO RELATED APPLICATIONS

The present application is a continuation of PCT Application No. PCT/CN2006/001980, filed on Aug. 7, 2006, which claims a priority to Chinese Patent Application No. 200510105698.4, filed on Sep. 30, 2005. All of these applications are incorporated herein by reference for all purposes.

FIELD OF THE INVENTION

The present invention relates to the field of wireless communication technologies, and in particular to a method, a system, an access terminal and an access network for transmitting a forward traffic channel at a fixed rate.

BACKGROUND OF THE INVENTION

Currently, the technology of CDMA2000 Single Carrier Evolution-Data Optimized (1xEV-DO) uses a single carrier to transmit data traffic. With the development of communication technologies, a higher data transmission rate is desired. The Third Generation Partnership Project 2 (3GPP2) proposes a new air interface evolution plan. In the first phase of the plan, a great increase in air interface data transmission rate is enabled through using Multiple Carrier EV-DO (NxEV-DO). It is required that the forward data transmission rate is no lower than N times of 3.1 Mbps and the reverse data transmission rate is no lower than N times of 1.8 Mbps, in which N is the number of carriers used by an Access Network (AN) or an Access Terminal (AT). An NxEV-DO system also has to enable dynamic and independent allocation and deletion of forward carriers and reverse carriers through coordinated operations of the AN and the AT, but the number of the forward carriers and the number of the reverse carriers are not required to be symmetric.

In a 1xEV-DO system, an operation status of a forward traffic channel may be divided into a variable-rate status and a fixed-rate status. In the variable-rate status, the AT notifies the AN of the AT's desired service sector and data rate through transmitting a Data Rate Control (DRC) channel. When the AN cannot demodulate the DRC channel due to degradation of reverse carrier links or other reasons, the AN may not transmit a forward traffic channel to the AT. At this time, the AN notifies the AT that the AN may not receive the DRC channel correctly, and the AT notifies, through a FixedModeEnable (Fixed Mode Enable) message, the AN of information about the sector from which AT expects to receive a forward traffic channel, and also a fixed data rate at which AT expects to receive the forward traffic channel. The format of the FixedModeEnable message in the 1x-EV-DO system is as illustrated in Table 1.

TABLE 1

| Field | Length (in bit) |
| --- | --- |
| MessageID | 8 |
| TCAMessageSequence | 8 |
| DRCCover | 3 |
| DRCValue | 4 |
| EndTime | 16 |
| Reserved | 1 |

In Table 1, the field MessageID (Message Identifier) is adapted to identify a FixedModeEnable message, and is set as 0×00 by the AT. The field TCAMessageSequence (Traffic Channel Assignment Message Sequence) is set by the AT as a value of the field MessageSequence in a TCA message. The field DRCCover (Data Rate Control Cover) is set by the AT to the DRC cover associated with the sector in AT's Active Set from which the AT expects to receive packets on the forward traffic channel at a fixed rate. The field DRCValue (Data Rate Control Value) is set by the AT as a value of a fixed rate. The field EndTime is set by the AT as a time at which the AT intends to end a fixed-rate status. The field Reserved is set by the AT as 0, and is ignored by the AN.

Portions appended to a FixedModeEnable message are as illustrated in Table 2.

TABLE 2

| Channel Addressing | RTC Unicasting | SLP Priority | Best Effort 40 |
| --- | --- | --- | --- |

The information in Table 2 shows the portions that are appended to any message. The Channel indicates a channel over which a FixedModeEnable message may be transmitted, for instance, a Reverse Traffic Channel (RTC). The Addressing indicates that a FixedModeEnable message is transmitted in a unicast way but not in a broadcast or multicast way. The SLP indicates that a FixedModeEnable message is transmitted in a best-effort way. In the best-effort way, a FixedModeEnable message is transmitted only once and may be lost during the transmission. The Priority indicates a priority in which a FixedModeEnable message is transmitted, and the smaller the number of the Priority is, the higher the priority is.

In a multiple carrier EV-DO system, the operation status of a forward traffic channel may also be divided into a variable-rate status and a fixed-rate status. In the 1xEV-DO system, a sector is provided with only one forward carrier link; while in the multiple carrier EV-DO system, a sector may be provided with a plurality of forward carrier links. In the variable-rate status, an AN transmits a forward traffic channel at a variable rate, with the value of the rate designated by DRC. In the fixed-rate status, the AN transmits a forward traffic channel(s) to the AT at a fixed rate from one or more specific sectors. If the AT needs to transform from the variable-rate status to the fixed-rate status, the AT transmits a FixedModeEnable message to the AN.

A FixedModeEnable message in the current multiple carrier EV-DO system has a format as illustrated in Table 3.

TABLE 3

| Field | Length (in bit) |
| --- | --- |
| MessageID | 8 |
| TCAMessageSequence | 8 |
| NumForwardChannels | 5 |
| NumForwardChannel occurrences of the following record: | |
| DRCCover | 3 |
| DRCValue | 4 |
| EndTime | 16 |
| Reserved | 1 |

The format of the FixedModeEnable message in Table 3 is substantially the same as the format of the FixedModeEnable message in Table 1 except for an additional field NumForwardChannels (the number of forward carriers), and the other fields and their definitions are identical. The field DRCCover identifies a sector from which the AT intends to receive a forward carrier link. The AT sets the field NumForwardChannels as the number of sectors from which the AT intends to receive forward traffic channels. The fields DRCValue and DRCCover occur for NumForwardChannels times.

In the multiple carrier EV-DO system, because Data Rate Control (DRC) channels may be transmitted over a plurality of reverse carrier links, there is a need for the AT to intend to receive a forward traffic channel(s) at a fixed rate from a specific forward carrier link(s) of a sector. However, the current format of the FixedModeEnable message may result in that all forward carrier links of a specific sector(s) transmit a forward traffic channel(s) at the same fixed rate.

Obviously, the above method for transmitting a forward traffic channel(s) in a fixed-rate status may not satisfy the need for the AT to receive a forward traffic channel(s) at a fixed rate from a specific forward carrier link(s) of a specific sector(s).

SUMMARY OF THE INVENTION

The invention is to provide a method and a system for transmitting a forward traffic channel at a fixed rate, so that an access network may transmit a forward traffic channel at a fixed rate from a specific forward carrier link(s) of a specific sector(s), thus improving flexibility in transmitting a forward traffic channel.

So an embodiment of the invention provides a method for transmitting a forward traffic channel at a fixed rate. The method includes:

determining, by an access terminal, that the access terminal needs to receive a forward traffic channel at a fixed rate from each of one or more forward carrier links, and transmitting, by the access terminal, identification information of each of the one or more forward carrier links to an access network;

transmitting, by the access network, the forward traffic channel at the fixed rate according to the received identification information.

The following solutions of the method are optional.

When the one or more forward carrier links comprise a plurality of forward carrier links, the plurality of forward carrier links are distributed in one or more sectors.

The transmitting the identification information of each of the one or more forward carrier links to the access network includes:

setting, by the access terminal, the identification information of each of the one or more forward carrier links in a Fixed Mode Enable message, and transmitting the Fixed Mode Enable message to the access network.

The identification information of each of the one or more forward carrier links comprises an index value of the forward carrier link in a Traffic Channel Assignment message and information of a sector in which the forward carrier link is located; or frequency information of the forward carrier link and information of a sector in which the forward carrier link is located.

The transmitting the identification information of each of the one or more forward carrier links to the access network includes:

when the identification information comprises the index value and the sector information, setting, by the access terminal, the index value of the forward carrier link to a Forward Carrier Link Index field in the Fixed Mode Enable Message, and when the identification information comprises the frequency information and the sector information, setting, by the access terminal, the frequency information of the forward carrier link to a Forward Carrier Link Frequency field in the Fixed Mode Enable Message;

setting, by the access terminal, the sector information to a Data Rate Control Cover field in the Fixed Mode Enable message; and transmitting the Fixed Mode Enable message to the access network.

The transmitting the forward traffic channel at the fixed rate according to the received identification information includes:

obtaining, by the access network, from the information set in the Fixed Mode Enable message, the index value of the forward carrier link in the Traffic Channel Assignment message and the information of the sector in which the forward carrier link is located, or the frequency information of the forward carrier link and the information of the sector in which the forward carrier link is located;

determining, by the access network, the forward carrier link in the sector;

obtaining, by the access network, from the information set in the Fixed Mode Enable message, a fixed rate required by the access terminal; and transmitting, by the access network, the forward traffic channel over the determined forward carrier link at the fixed rate.

The transmitting the identification information of the forward carrier link to the access network further includes:

setting an identification indicating a single carrier or multiple carriers in the Fixed Mode Enable message, wherein the transmitting the forward traffic channel at the fixed rate according to the received identification information includes:

transmitting, by the access network, the forward traffic channel at the fixed rate according to the identification information of the forward carrier link set in the Fixed Mode Enable message, when determining that the identification indicating multiple carriers is set in the Fixed Mode Enable message.

The transmitting the forward traffic channel at the fixed rate according to the identification information of the forward carrier links set in the Fixed Mode Enable message includes:

when determining, by the access network, that the identification indicating multiple carriers is set in the Fixed Mode Enable message, obtaining, by the access network, from the information set in the Fixed Mode Enable message, the index value of the forward carrier link in the Traffic Channel Assignment message or the frequency information of the forward carrier link, and the information of the sector in which the forward carrier link is located; determining, by the access network, the forward carrier link in the sector;

obtaining, by the access network, from the information set in the Fixed Mode Enable message, a fixed rate required by the access terminal; and transmitting, by the access network, the forward traffic channel over the determined forward carrier link at the fixed rate.

The transmitting the forward traffic channel at the fixed rate according to the received identification information further includes:

when determining, by the access network, that the identification indicating a single carrier is set in the Fixed Mode Enable message, obtaining, by the access network, the sector information and the fixed rate set in the Fixed Mode Enable message; and transmitting the forward traffic channel at the fixed rate according to the sector information.

Still another embodiment of the invention provides an access terminal. The access terminal includes an identification transmitting module;

the identification transmitting module is adapted to transmit identification information of each of one or more forward carrier links to an access network when determining that the access terminal needs to receive a forward traffic channel at a fixed rate from each of the one or more forward carrier links, to enable the access network to transmit the forward traffic channel at the fixed rate according to the identification information.

A further embodiment of the invention provides an access network. The access network includes a transmitting module; the transmitting module is adapted to receive identification information of each of one or more forward carrier links transmitted from an access terminal, and to transmit a forward traffic channel at a fixed rate according to the identification information.

Another embodiment of the invention provides a method for transmitting a forward traffic channel at a fixed rate. The method includes: determining, by an access terminal, a forward carrier link from which the access terminal wants to receive a forward traffic channel at a fixed rate; transmitting, by the access terminal, identification information of the forward carrier link to an access network; and receiving, by the access terminal, the forward traffic channel sent from the access network.

Another embodiment of the present invention provides a method for transmitting a forward traffic channel at a fixed rate. The method includes: obtaining, by a access network, from a access terminal, identification information of a forward carrier link from which the access terminal wants to receive a forward traffic channel at a fixed rate; transmitting, by the access network, the forward traffic channel at the fixed rate according to the received identification information from the access terminal.

As seen from the description of the technical solutions, the access terminal transmits identification information of a specific forward carrier link to the access network, such that the access network may selectively and initiatively designate the forward carrier link over which the access network transmits a traffic channel at a fixed rate. Because the access network in the embodiments may transmit the forward traffic channel from the specific forward carrier link at a fixed rate according to the received identification information of the specific forward carrier link, the need may be satisfied for the AT to receive one or more forward traffic channels at a fixed rate from one or more forward carrier links of a specific sector. Moreover, when DRC channel demodulation fails over a reverse carrier link of a specific sector, it may not necessarily result in that all carrier links of the specific sector, which carrier links are used to transmit a forward traffic channel, transmit the forward traffic channels at the fixed rate. The identification information of a specific forward carrier link may be presented in various forms. For instance, a specific forward carrier link of a specific sector may be determined from an index value of the specific forward carrier link in a Traffic Channel Assignment message and the sector in which the specific forward carrier link is located. For another instance, a specific forward carrier link of a specific sector may be determined from frequency information of the specific forward carrier link and the sector in which the specific forward carrier link is located. Transmitting the identification information of a specific forward carrier link may be enabled through setting the field of Forward Carrier Link Index or Forward Carrier Link Frequency in the FixedModeEnable Message, and using this field and the field of Sector Information to carry the identification information of the specific forward carrier link, without any change to contents of other fields in the FixedModeEnable Message. The inventive solutions may be compatible with a single carrier system through carrying in the FixedModeEnable Message identification information indicative of a single carrier or multiple carriers, thus enhancing flexibility in transmitting a forward traffic channel and improving the multiple carrier EV-DO technology.

BRIEF DESCRIPTIONS OF THE DRAWINGS

FIG. 1 is a flow chart illustrating a method for transmitting a forward traffic channel based on a fixed-rate status according to an embodiment of the invention.

DETAILED DESCRIPTIONS OF THE EMBODIMENTS

According to the technical solutions of embodiments of the invention, when an access terminal determines that it needs to receive one or more forward traffic channels at a fixed rate from one or more specific forward carrier links, the access terminal transmits identification information of the one or more specific forward carrier links to an access network, and the access network transmits the one or more forward traffic channels at the fixed rate according to the received identification information of the one or more specific forward carrier links.

The inventive technical solutions will be further described hereinafter.

When an AT determines that it needs to receive a forward traffic channel from a specific forward carrier link of a specific sector, the access terminal transmits identification information of the specific forward carrier link to an AN. The AN may transmit the identification information of the specific forward carrier link by carrying the identification information via a FixedModeEnable message.

In one embodiment of the invention, the forward carrier link selected and designated initiatively by the AT may be one or more forward carrier links, and in the case of a plurality of forward carrier links, these specific forward carrier links may be distributed in one specific sector or in different specific sectors. In other words, the AT may determine that it needs to receive a forward traffic channel from one specific forward carrier link of one specific sector as it designates, may determine that it needs to receive forward traffic channels from a plurality of specific forward carrier links of one specific sector as it designates, and also may determine that it needs to receive forward traffic channels from a plurality of specific forward carrier links of a plurality of specific sectors as it designates.

The identification information of the specific forward carrier link may be in various forms, as long as it may identify a specific forward carrier link of a specific sector uniquely.

When the identification information of the specific forward carrier link is transmitted through a FixedModeEnable message, the identification information of the specific forward carrier link may be presented in a form of an index value of the specific forward carrier link in a TCA message and information of the sector in which the specific forward carrier link is located, and also may be presented in a form of frequency information of the specific forward carrier link and information on the sector in which the specific forward carrier link is located.

When the identification information of the specific forward carrier link is transmitted via a FixedModeEnable message, the format of a FixedModeEnable message in the current multiple carrier EV-DO system is modified in an embodiment of the invention. In other words, a field for carrying identification information of a specific forward carrier link is added to a FixedModeEnable message.

When the identification information of the specific forward carrier link is an index value of the specific forward carrier link in a TCA message and information on the sector in which the specific forward carrier link is located, the format of a FixedModeEnable message according to an embodiment of the invention is as illustrated in Table 4.

TABLE 4

| Field | Length (in bit) |
|---|---|
| MessageID | 8 |
| TCAMessageSequence | 8 |
| NumForwardChannels | 4 |
| NumForwardChannels occurrences of the following record: | |
| ForwardChannelIndex | 4 |
| DRCCover | 3 |
| DRCValue | 4 |
| EndTime | 16 |
| Reserved | 1 |

The format of a FixedModeEnable message illustrated in Table 4 is substantially the same as the format of a FixedModeEnable message illustrated in Table 2 except for an additional field ForwardChannelIndex (Forward Channel Index), and the other fields and definitions of the other fields are identical. The AT sets the field ForwardChannelIndex as an index value of a specific forward carrier link in a TCA message. The AT needs to receive a forward traffic channel from the forward carrier link corresponding to the index value. The field ForwardChannelIndex occurs for NumberForwardChannels times.

Because in the TCA message, forward carrier links allocated by the AN are arranged in an order of frequency, a value of ForwardChannelIndex together with a value of DRCcover field may uniquely identify a forward carrier link of a sector.

When determining the identification information of the specific forward carrier link and transmitting the FixedModeEnable message, the AT sets the field ForwardChannelIndex additionally, and then transmits the FixedModeEnable message to the AN.

The AN receives the FixedModeEnable message, and obtains from the information carried in the FixedModeEnable message the NumForwardChannels values of ForwardChannelIndex and the NumForwardChannels values of DRCcover. The AN may determine accurately NumForwardChannels specific forward carrier links according to the NumForwardChannels values of ForwardChannelIndex and the NumForwardChannels values of DRCcover. Then, the AN transmits forward traffic channels over the specific forward carrier links of the specific sector(s) at a fixed rate according to the corresponding values of DRCValue carried in the FixedModeEnable message. Thus, the AT may receive the forward traffic channels from the specific forward carrier links of the specific sector(s) as it selects and designates initiatively.

When the information of the specific forward carrier link is frequency information of the specific forward carrier link, the format of a FixedModeEnable message in an embodiment of the invention is as illustrated in Table 5.

TABLE 5

| Field | Length (in bit) |
|---|---|
| MessageID | 8 |
| TCAMessageSequence | 8 |
| NumForwardChannels | 4 |
| NumForwardChannels occurrences of the following record: | |
| Channel | 24 |
| DRCCover | 3 |

TABLE 5-continued

| Field | Length (in bit) |
|---|---|
| DRCValue | 4 |
| EndTime | 16 |
| Reserved | 1 |

The format of a FixedModeEnable message illustrated in Table 5 is substantially the same as the format of a FixedModeEnable message illustrated in Table 2 except for an additional field Channel, and the other fields and definitions of the other fields are identical. It is required for the AT to set the field Channel as frequency information of a specific forward carrier link, and receive a forward traffic channel from the forward carrier link corresponding to the frequency value. The field Channel occurs for NumberForwardChannels times.

The field Channel together with the field DRCcover in the FixedModeEnable message may uniquely identify a forward carrier link in a sector.

When determining the identification information of the specific forward carrier link and transmitting the FixedModeEnable message, the AT sets the field Channel additionally, and then transmits the FixedModeEnable message to the AN.

The AN receives the FixedModeEnable message, and obtains from information carried in the FixedModeEnable message the NumForwardChannels values of Channel and the NumForwardChannels values of DRCcover. The AN may determine accurately the NumForwardChannels specific forward carrier links according to the obtained NumForwardChannels values of Channel and NumForwardChannels values of DRCcover. Then, the AN transmits forward traffic channels over the specific forward carrier links of the specific sector(s) at a fixed rate according to the corresponding values of DRCValue carried in the FixedModeEnable message. Thus, the AT may receive the forward traffic channels from the specific forward carrier links of the specific sector(s) as selected and designated initiatively by itself.

Because the AT may be an access terminal of multiple carrier EV-DO or an access terminal of a single carrier EV-DO, according to an embodiment of the invention, an identification indicating a single carrier or multiple carriers may be carried by the AT in a FixedModeEnable message to be transmitted to the AN, in order to make the inventive technical solutions compatible to a single carrier EV-DO system.

When the identification information of the specific forward carrier link is an index value of the specific forward carrier link in a TCA message and information on the sector in which the specific forward carrier link is located and an identification indicating a single carrier or multiple carriers is carried in a FixedModeEnable message, the format of the FixedModeEnable message is illustrated in Table 6.

TABLE 6

| Field | Length (in bit) |
|---|---|
| MessageID | 8 |
| TCAMessageSequence | 8 |
| NumForwardChannels | 4 |
| DRCCover | 3 |
| DRCValue | 4 |
| EndTime | 16 |
| MultipleFLIncluded | 1 |
| NumForwardLinks | 0 or 4 |

TABLE 6-continued

| Field | Length (in bit) |
|---|---|
| NumForwardLinks occurrences of the following record: | |
| ForwardLinkIndex | 0 or 4 |
| DRCCover | 0 or 3 |
| DRCValue | 0 or 4 |
| Reserved | Variable |

The fields in the upper half part of the FixedModeEnable message in Table 6, i.e. MessageID, TCAMessageSequence, DRCCover, DRCValue and EndTime, have the same definitions as those in Table 1. Through changing the field Reserved in Table 1 to a field MultipleFLIncluded, it may be effectively determined whether the AT transmitting the FixedModeEnable message is an AT of 1xEV-DO or an AT of multiple carrier EV-DO. For instance, when the field MultipleFLIncluded is set as 0, it indicates that the AT is an AT of a single carrier EV-DO, and at this time, none of the fields behind this field is included in the FixedModeEnable message; and when this field is set as 1, it indicates that the AT is an AT of multiple carrier EV-DO, and the AN reads only contents of fields behind the field MultipleFLIncluded. In Table 6, the fields behind the field MultipleFLIncluded and definitions of those fields are substantially the same as those fields in Table 3 and definitions thereof, except for an additional field ForwardLinkIndex. The AT sets the field ForwardLinkIndex as an index value of a specific forward carrier link in a TCA message, i.e., the AT needs to receive a forward traffic channel from the forward carrier link corresponding to the index value. The fields ForwardLinkIndex, DRCCover and DRCValue occur repeatedly for NumberForwardLinks times. The field Reserved in Table 6 has a variable length, and is used for padding the length of the message FixedModeEnable, for instance, padding the FixedModeEnable message to be in a length of a multiple of 8 bits.

With the field MultipleFLIncluded of the message, the inventive solutions may be effectively compatible with a single carrier system, and thus gain a good backward compatibility.

When determining the identification information of the specific forward carrier link and transmitting a FixedModeEnable message, the AT sets the fields ForwardLinkIndex and MultipleFLIncluded additionally, and then transmits the FixedModeEnable message to the AN.

The AN receives the FixedModeEnable message, and upon determination that the content of the field MultipleFLIncluded indicates a multiple carrier identification, obtains the NumForwardLinks values of ForwardLinkIndex and the NumForwardLinks values of DRCcover from the information carried in the FixedModeEnable message. The AN may determine accurately specific forward carrier links according to the NumForwardLinks values of ForwardChannelIndex and the NumForwardLinks values of DRCcover. Then, the AN transmits the forward traffic channel(s) over the specific forward carrier link(s) of a specific sector(s) at a fixed rate according to the corresponding values of DRCValue carried in the FixedModeEnable message. Thus, the AT may receive the forward traffic channels from the specific forward carrier links of the specific sector(s) as selected and designated initiatively.

Upon determining that the content of the field MultipleFLIncluded indicates a single carrier identification, the AN obtains from the information carried in the FixedModeEnable message the value of DRCcover and the value of DRCValue, and transmits the forward traffic channel over a forward carrier link of the sector corresponding to the DRCover at a fixed rate which has the value of DRCValue.

When the identification information of the specific forward carrier link is frequency information (frequency value) of the specific forward carrier link, and an identification indicating a single carrier or multiple carriers is carried in a FixedModeEnable message, the format of the FixedModeEnable message is illustrated in Table 7.

TABLE 7

| Field | Length (in bit) |
|---|---|
| MessageID | 8 |
| TCAMessageSequence | 8 |
| DRCCover | 3 |
| DRCValue | 4 |
| EndTime | 16 |
| MultipleFLIncluded | 1 |
| NumForwardLinks | 0 or 4 |
| NumForwardLinks occurrences of the following record: | |
| Channel | 0 or 24 |
| DRCCover | 0 or 3 |
| DRCValue | 0 or 4 |
| Reserved | Variable |

The fields in the upper half part of the FixedModeEnable message in Table 7, i.e. MessageID, TCAMessageSequence, DRCCover, DRCValue and EndTime, have the same definitions as those in Table 1. Through changing the field Reserved in Table 1 to a field MultipleFLIncluded, it may be effectively determined whether the AT transmitting the FixedModeEnable message is an AT of 1xEV-DO or an AT of multiple carrier EV-DO. For instance, when this field MultipleFLIncluded is set as 0, it indicates that the AT is an AT of a single carrier EV-DO, and at this time, none of the fields behind this field is included in the FixedModeEnable message; and when this field is set as 1, it indicates that the AT is an AT of multiple carrier EV-DO, and the AN reads to read only contents of fields behind the field MultipleFLIncluded.

In Table 7, the fields behind the field MultipleFLIncluded and definitions of those fields are substantially the same as those fields in Table 3 and definitions thereof except for an additional field Channel. It is required for the AT to set the field Channel as frequency information of a specific forward carrier link, and receive a forward traffic channel from the forward carrier link corresponding to the frequency value. The fields Channel, DRCCover and DRCValue occur repeatedly for NumberForwardLinks times. The field Reserved in Table 7 has a variable length, and is used for padding the length of the message FixedModeEnable, for instance, padding the FixedModeEnable message to be in a length of a multiple of 8 bits.

When determining the identification information of the specific forward carrier link and transmitting a FixedModeEnable message, the AT sets the fields Channel and MultipleFLIncluded additionally, and then transmits the FixedModeEnable message to the AN.

The AN receives the FixedModeEnable message, and upon determining that the content of the field MultipleFLIncluded indicates a multiple carrier identification, obtains the NumForwardLinks values of Channel and the NumForwardLinks values of DRCcover from the information carried in the FixedModeEnable message. The AN may determine accurately NumForwardLinks specific forward carrier links according to the obtained NumForwardLinks values of ForwardChannelIndex and NumForwardLinks values of DRCcover. Then, the AN transmits the forward traffic channels over the specific forward carrier links of a specific sector(s) at a fixed rate according to the corresponding values of DRCValue carried in the FixedModeEnable message. Thus, the AT may receive the forward traffic channels from the specific forward carrier links of the specific sector(s) as selected and designated initiatively.

Upon determining that the content of the field MultipleFLIncluded indicates a single carrier identification, the AN obtains from the FixedModeEnable message the value of DRCcover and the value of DRCValue, and transmits the forward traffic channel over a forward carrier link of the sector corresponding to the DRCover at a fixed rate which has the value of DRCValue.

A method for transmitting a forward traffic channel according to an embodiment of the invention will be described hereinafter with reference to FIG. 1.

In FIG. 1, in step 1-1, an AT of multiple carrier EV-DO determines identification information of one or more specific forward carrier links upon determining that it needs to receive one or more forward traffic channels from the one or more specific forward carrier links in one or more specific sectors.

In step 1-2, the AT sets the identification information of the one or more forward carrier links in a FixedModeEnable message, for instance, sets the fields DRCover and ForwardLinkIndex or sets the fields DRCover and Channel; the AT sets the field MultipleFLIncluded as a multiple carrier identification, and transmits the FixedModeEnable message to an AN.

In step 1-3, the AN receives the FixedModeEnable message, and upon determining that the field MultipleFLIncluded is set as the multiple carrier identification, obtains from the information carried in the FixedModeEnable message the information on the one or more forward carrier links, for instance, obtains NumForwardLinks values of Channel and NumForwardLinks values of DRCcover, or obtains NumForwardLinks values of ForwardLinkIndex and NumForwardLinks values of DRCcover. The AN may determine accurately NumForwardLinks specific forward carrier links according to the obtained information.

In step 1-4, the AN transmits the one or more forward traffic channels over the one or more specific forward carrier links of one or more specific sectors as determined at a fixed rate according to one or more corresponding values of DRCValue carried in the FixedModeEnable message.

In step 1-5, the AN receives the one or more forward traffic channels from the one or more specific forward carrier links of the one or more specific sectors as selected and designated initiatively.

A system for transmitting a forward traffic channel according to an embodiment of the invention includes an AN, and N ATs. A transmitting module is provided in the AN, and an identification transmitting module is provided in each of the ATs.

Upon determining that an AT needs to receive one or more forward traffic channels at a fixed rate from one or more specific forward carrier links of one or more specific sectors, the identification transmitting module in the AT transmits identification information of the one or more specific forward carrier links to the AN. The identification transmitting module in the AT may carry the identification information of the one or more specific forward carrier links in the FixedModeEnable message and transmit the identification information of the one or more specific forward carrier links to the AN.

The procedure for the identification transmitting module in the AT to transmit the identification information of the one or more specific forward carrier links with the FixedModeEnable message is as described in the above method.

The transmitting module in the AN may determine the one or more specific forward carrier links as selected and designated by the AT according to the information carried in the FixedModeEnable message, such as the value of ForwardLinkIndex, the value of DRCcover, and etc. The transmitting module in the AN transmits the one or more forward traffic channels over the one or more specific forward carrier links of one or more specific sectors as determined at a fixed rate according to one or more corresponding values of DRCValue carried in the FixedModeEnable message. The detail procedure is as described in the above method.

To ensure a good compatibility of the inventive system, a field MultipleFLIncluded may also be included in the FixedModeEnable message, as described in the above method.

An access terminal and an access network provided in an embodiment of the invention are as described in the above method and system, and therefore, descriptions thereof will not be repeated here.

While the invention has been described with respect to the embodiments thereof, it shall be obvious to those skilled in the art that, various modifications and variations may be made to the invention without departing from the spirit of the invention, and thus shall be encompassed in the appended claims of the invention.

The invention claimed is:

1. A method for transmitting a forward traffic channel at a fixed rate, comprising:
   determining, by an access terminal, that the access terminal needs to receive a forward traffic channel at a fixed rate from each of one or more forward carrier links;
   setting, by the access terminal, the identification information of each of the one or more forward carrier links in a Fixed Mode Enable message;
   transmitting, by the access terminal, the Fixed Mode Enable message to the access network; and
   transmitting, by the access network, the forward traffic channel at the fixed rate according to the identification information of each of the one or more forward carrier links.

2. The method according to claim 1, wherein when the one or more forward carrier links comprise a plurality of forward carrier links, the plurality of forward carrier links are distributed in one or more sectors.

3. The method according to claim 1, wherein the identification information of each of the one or more forward carrier links comprises an index value of the forward carrier link in a Traffic Channel Assignment message and information of a sector in which the forward carrier link is located; or frequency information of the forward carrier link and information of a sector in which the forward carrier link is located.

4. The method according to claim 3, wherein setting, by the access terminal, the identification information of each of the one or more forward carrier links in a Fixed Mode Enable message and transmitting, by the access terminal, the Fixed Mode Enable message to the access network comprises:
   when the identification information comprises the index value and the sector information, setting, by the access terminal, the index value of the forward carrier link to a Forward Carrier Link Index field in the Fixed Mode Enable Message, and when the identification information comprises the frequency information and the sector information, setting, by the access terminal, the frequency information of the forward carrier link to a Forward Carrier Link Frequency field in the Fixed Mode Enable Message;

setting, by the access terminal, the sector information to a Data Rate Control Cover field in the Fixed Mode Enable message; and transmitting, by the access terminal, the Fixed Mode Enable message to the access network.

5. The method according to claim 4, wherein the transmitting the forward traffic channel at the fixed rate according to the identification information of each of the one or more forward carrier links comprises:

obtaining, by the access network, from the information set in the Fixed Mode Enable message, the index value of the forward carrier link in the Traffic Channel Assignment message and the information of the sector in which the forward carrier link is located, or the frequency information of the forward carrier link and the information of the sector in which the forward carrier link is located;

determining, by the access network, the forward carrier link in the sector;

obtaining, by the access network, from the information set in the Fixed Mode Enable message, a fixed rate required by the access terminal; and transmitting, by the access network, the forward traffic channel over the determined forward carrier link at the fixed rate.

6. The method according to claim 4, wherein the setting, by the access terminal, the identification information of each of the one or more forward carrier links in a Fixed Mode Enable message further comprises:

setting an identification indicating a single carrier or multiple carriers in the Fixed Mode Enable message, wherein the transmitting the forward traffic channel at the fixed rate according to the identification information of each of the one or more forward carrier links comprises:

transmitting, by the access network, the forward traffic channel at the fixed rate according to the identification information of the forward carrier link set in the Fixed Mode Enable message, when determining that the identification indicating multiple carriers is set in the Fixed Mode Enable message.

7. The method according to claim 6, wherein the transmitting the forward traffic channel at the fixed rate according to the identification information of the forward carrier links set in the Fixed Mode Enable message comprises:

when determining, by the access network, that the identification indicating multiple carriers is set in the Fixed Mode Enable message, obtaining, by the access network, from the information set in the Fixed Mode Enable message, the index value of the forward carrier link in the Traffic Channel Assignment message or the frequency information of the forward carrier link, and the information of the sector in which the forward carrier link is located;

determining, by the access network, the forward carrier link in the sector;

obtaining, by the access network, from the information set in the Fixed Mode Enable message, a fixed rate required by the access terminal; and transmitting, by the access network, the forward traffic channel over the determined forward carrier link at the fixed rate.

8. The method according to claim 6, wherein the transmitting the forward traffic channel at the fixed rate according to the identification information of each of the one or more forward carrier links further comprises:

when determining, by the access network, that the identification indicating a single carrier is set in the Fixed Mode Enable message, obtaining, by the access network, the sector information and the fixed rate set in the Fixed Mode Enable message; and transmitting the forward traffic channel at the fixed rate according to the sector information.

9. An access terminal, comprising an identification transmitting module, wherein the identification transmitting module is configured to set identification information of each of the one or more forward carrier links in a Fixed Mode Enable message and transmit the Fixed Mode Enable message to the access network when determining that the access terminal needs to receive a forward traffic channel at a fixed rate from each of the one or more forward carrier links, to enable the access network to transmit the forward traffic channel at the fixed rate according to the identification information of each of one or more forward carrier links.

10. An access network, comprising a transmitting module, wherein the transmitting module is configured to receive identification information of each of one or more forward carrier links transmitted from an access terminal, and to transmit a forward traffic channel at a fixed rate according to the identification information of each of one or more forward carrier links, wherein the identification information of each of the one or more forward carrier links is carried in a Fixed Mode Enable message.

11. A method for transmitting a forward traffic channel at a fixed rate, comprising:

determining, by an access terminal, a forward carrier link from which the access terminal wants to receive a forward traffic channel at a fixed rate;

setting, by the access terminal, the identification information in a Fixed Mode Enable message;

transmitting, by the access terminal, the Fixed Mode Enable message to the access network; and receiving, by the access terminal, the forward traffic channel sent from the access network.

12. The method according to claim 11, wherein the forward carrier link is distributed in a sector.

13. The method according to claim 11, wherein the identification information comprises an index value of the forward carrier link in a Traffic Channel Assignment message and information of a sector in which the forward carrier link is located; or frequency information of the forward carrier link and information of a sector in which the forward carrier link is located.

14. The method according to claim 13, further comprising:

when the identification information comprises the index value and the sector information, setting, by the access terminal, a Forward Carrier Link Index field in the Fixed Mode Enable Message, wherein the setting the identification information in the Fixed Mode Enable message comprises:

setting the index value of the forward carrier link to the Forward Carrier Link Index field and setting the sector information to a Data Rate Control Cover field in the Fixed Mode Enable message; and when the identification information comprises the frequency information and the sector information, setting, by the access terminal, a field of Forward Carrier Link Frequency in the Fixed Mode Enable Message, wherein the setting the identification information in the Fixed Mode Enable message comprises: setting the frequency information of the forward carrier link to the Forward Carrier Link Frequency field and setting the sector information to a Data Rate Control Cover field in the Fixed Mode Enable message.

15. A method for transmitting a forward traffic channel at a fixed rate, comprising:

receiving, by a access network, a Fixed Mode Enable message including identification information of a forward carrier link from a access terminal which wants a forward traffic channel at a fixed rate;

obtaining, by the access network, the identification information of the forward carrier link from the Fixed Mode Enable message; and transmitting, by the access network, the forward traffic channel at the fixed rate according to the identification information of the forward carrier link from the access terminal.

16. The method according to claim 15, wherein the identification information comprises:

an index value of the forward carrier link in a Traffic Channel Assignment message and information of a sector in which the forward carrier link is located; or frequency information of the forward carrier link and information of a sector in which the forward carrier link is located, wherein the index value of the forward carrier link in the Traffic Channel Assignment message is set to a Forward Carrier Link field in the Fixed Mode Enable message, the frequency information of the forward carrier link is set to a Forward Carrier Link Frequency field in the Fixed Mode Enable message and the sector information is set to a Data Rate Control Cover field in the Fixed Mode Enable message.

17. The method according to claim 16, wherein the transmitting the forward traffic channel comprises:

determining, by the access network, the forward carrier link in the sector according to the identification information set in the Fixed Mode Enable message;

obtaining, by the access network, from information set in the Fixed Mode Enable message, a fixed rate required by the access terminal; and transmitting, by the access network, the forward traffic channel over the determined forward carrier link at the fixed rate.

* * * * *